United States Patent
Wyman et al.

(10) Patent No.: US 10,423,587 B2
(45) Date of Patent: Sep. 24, 2019

(54) SYSTEMS AND METHODS FOR RENDERING GRAPHICAL ASSETS

(71) Applicant: Avago Technologies International Sales Pte. Limited, Singapore (SG)

(72) Inventors: Richard Wyman, Santa Clara, CA (US); David Wu, San Diego, CA (US); Jason Herrick, Santa Clara, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 15/793,815

(22) Filed: Oct. 25, 2017

(65) Prior Publication Data
US 2019/0079930 A1 Mar. 14, 2019

Related U.S. Application Data

(60) Provisional application No. 62/556,301, filed on Sep. 8, 2017.

(51) Int. Cl.
| | |
|---|---|
| G09G 5/00 | (2006.01) |
| G06F 16/178 | (2019.01) |
| H04N 5/355 | (2011.01) |
| G06F 3/14 | (2006.01) |
| G09G 5/04 | (2006.01) |

(52) U.S. Cl.
CPC ........ *G06F 16/1794* (2019.01); *G06F 3/1415* (2013.01); *G09G 5/005* (2013.01); *G09G 5/04* (2013.01); *H04N 5/35509* (2013.01); *G09G 2320/0271* (2013.01); *G09G 2340/02* (2013.01); *G09G 2340/0407* (2013.01); *G09G 2340/0442* (2013.01)

(58) Field of Classification Search
CPC ..................................... H04N 1/6005
See application file for complete search history.

(56) References Cited

U.S. PATENT DOCUMENTS

| | | | | |
|---|---|---|---|---|
| 2012/0306905 A1* | 12/2012 | Kim | ......... | G09G 5/02 345/589 |
| 2016/0205372 A1* | 7/2016 | Liu | ......... | H04N 5/20 348/453 |
| 2016/0365065 A1 | 12/2016 | Wu et al. | | |

* cited by examiner

*Primary Examiner* — Nicholas R Wilson
(74) *Attorney, Agent, or Firm* — Foley & Lardner LLP

(57) ABSTRACT

Systems and methods are provided to render a plurality of graphical assets each having a format of a plurality of formats. Each graphical asset is processed by determining whether the format of the graphical asset is compatible with a predetermined render domain format and responsive to determining the format is not compatible with the predetermined render domain format, converting, using a format conversion circuit, the format to the predetermined render domain format. The plurality of graphical assets are rendered using a single rendering engine operable coupled to the format conversion circuit using the predetermined render domain format.

20 Claims, 3 Drawing Sheets

SYSTEMS AND METHODS FOR RENDERING GRAPHICAL ASSETS

CROSS REFERENCE TO RELATED APPLICATIONS

This application claims priority to and the benefit of U.S. Provisional Application No. 62/556,301, filed Sep. 8, 2017, entitled "SYSTEMS AND METHODS FOR RENDERING GRAPHICAL ASSETS", assigned to the assignee of this application, and which is incorporated herein by reference in its entirety for all purposes.

FIELD OF THE DISCLOSURE

This disclosure generally relates to systems and methods for rendering graphical assets, including but not limited to systems and methods for rendering graphical assets that are provided in multiple formats including high dynamic range and wide color gamut.

BACKGROUND OF THE DISCLOSURE

Graphical assets include, but are not limited to, fonts, textures, background images, video frames, etc. Graphical assets can be composed of digital data arranged in pixels in various formats. A rending system is used for rending graphical assets in various formats for display.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

Before turning to the figures, which illustrate the example embodiments in detail, it should be understood that the application is not limited to the details or methodology set forth in the description or illustrated in the figures. It should also be understood that the terminology is for the purpose of description only and should not be regarded as limiting.

Conventional rendering systems generally receive pixels in a particular format and render the pixels in the particular format for display. The rendering system can include a render engine that produces and blends pixels in a linear light domain. The linear light domain can have particular red, green, and blue primary colors and maintains the intensity and relative strength of each primary color in a format that is proportional to the electromagnetic energy of that primary color. For example, the primaries are defined by a standard red, green, blue component combination (sRGB standard) that matches the particular format of the received pixels. In other words, the conventional rendering systems can only render pixels that have formats matching the format of the rendering domain. In some circumstances, the input, output, and the render domain are all in compatible formats (e.g., standard dynamic range). However, the render engine associated with a standard dynamic range cannot render graphics in high dynamic range. A conventional rendering system has to use different render engines associated with different rendering domains to render graphics in different formats. It is advantageous to provide a rendering system that renders graphical assets in multiple formats (e.g., incompatible formats) and is not limited to the render domain format.

Referring generally to the figures, systems and methods for rendering graphical assets that are provided in multiple formats including high dynamic range and wide color gamut are shown according to various illustrative embodiments. The systems and methods of the present disclosure address the challenge by utilizing a format converter before rendering the graphics. Graphics in incompatible formats are converted by the format converter into a format associated with a rendering domain before rendering the graphics according to one or more embodiments. Utilizing the systems and methods of the present disclosure, in some implementations, a single rendering engine may be used to render content in a rendering domain format from a variety of incompatible formats.

Figure 1:
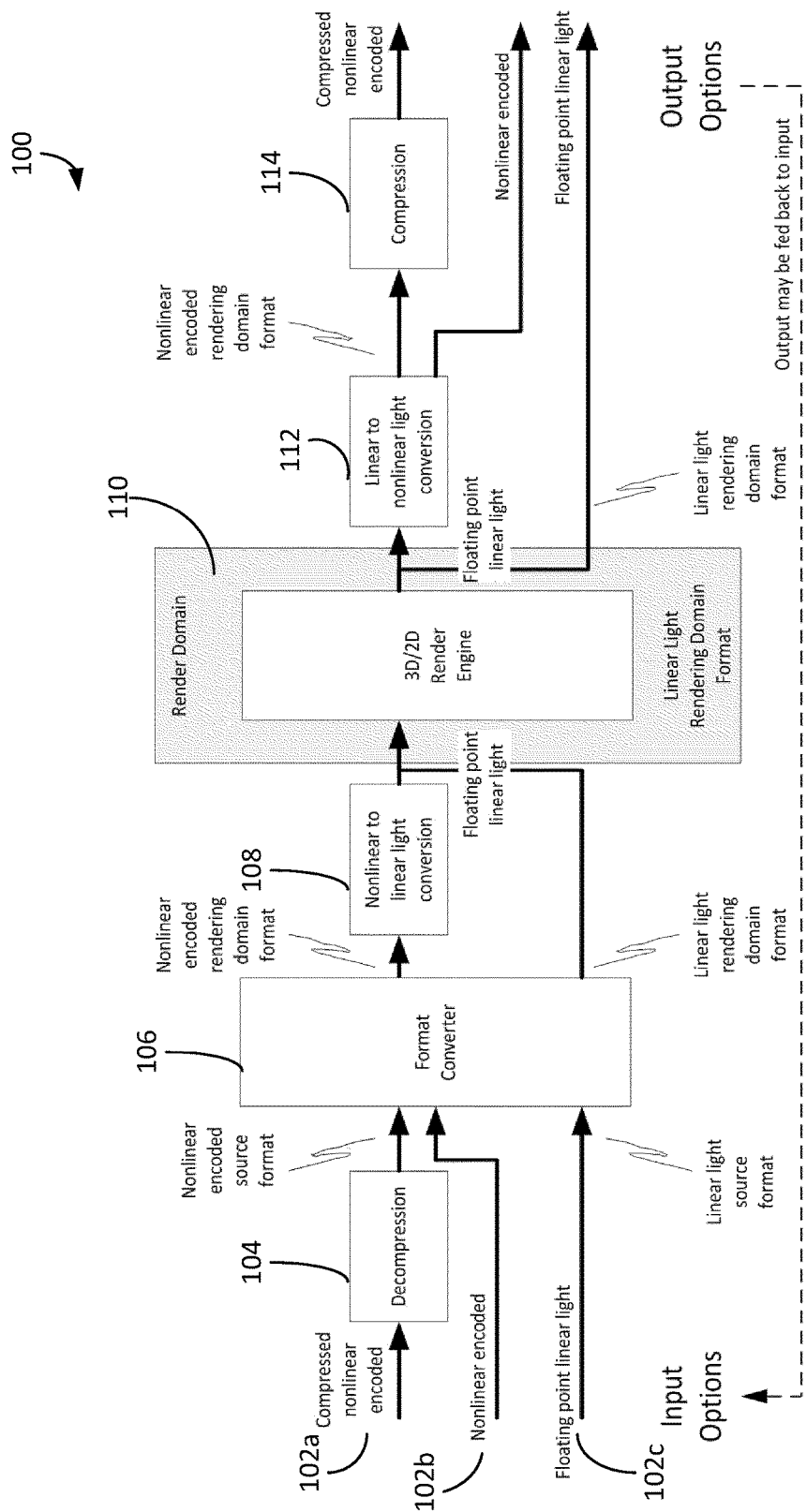
FIG. 1 is a diagram of a rendering system according to an illustrative embodiment.

Referring to FIG. 1, a diagram of a rendering system 100 is depicted according to an illustrative embodiment. The rendering system 100 is configured to render graphics from multiple sources and in multiple formats according to one or more embodiments. For example, the rendering system 100 receives a compressed nonlinear encoded graphical asset 102*a*, a nonlinear encoded graphical asset 102*b*, and/or a floating point linear light 102*c*, in some embodiments. The rendering system 100 includes a render engine 110 according to one or more embodiments. The render engine 110 is configured to render graphics in a render domain associated with the render engine 110. The render domain is predefined with a render domain format. The render domain is not limited to formats of input graphical assets in some embodiments. The render engine 110 can be a 3D/2D render engine that is configured to render 3D or 2D graphical assets in a format that is compatible to the render domain.

The rendering system 100 includes a format converter 106 configured to convert formats of graphical assets that are not compatible to the render domain to a format that is compatible with the render domain. When the input graphical assets have a format that is compatible with the render domain format of the render engine 110, the rendering system 100 can direct the graphical assets directly to the render engine 110 for rendering. When the input graphical assets have a format that is not compatible to the render domain format of the render engine 110, the rendering system 100 uses the format converter 106 to convert the format of the input graphical assets to the render domain format. For example, the rendering system 100 receives compressed nonlinear encoded assets 102*a*, nonlinear encoded assets 102*b* and floating point linear light 102*c*. In the illustrated embodiment, each of the assets 102*a*, 102*b*, and 102*c* has a format from a respective asset resource that is not compatible with the domain format of the render engine 110. The rendering system 100 uses the format converter 106 to convert each of the assets 102*a*, 102*b*, and 102*c* to the domain format, so that all the input assets from different assets resources are renderable by the render engine 110 within the render domain format.

The rendering system 100 includes a decompression module 104 configured to decompress input graphical assets. When the input graphical assets are compressed assets, the rendering system 100 uses the decompression module 104 to decompress the compressed assets before converting the assets by the format converter 106.

The rendering system 100 can include a nonlinear to linear light conversion module 108. Compared to the linear light format, the nonlinear encoded format can better follow the nonlinearities of the human visual system and allows for fewer bits and lower bandwidth while maintaining the same visual quality. The storage and bandwidth can be further reduced by using lossy and lossless compression on the nonlinearly encoded version of the asset. The nonlinear to linear light conversion module 108 is configured to convert nonlinear assets to linear assets after converting the assets to the domain format by the format converter 106. For example, when the rendering system 100 receives compressed nonlinear encoded assets 102a and the nonlinear encoded assets 102b, the rendering system 100 converts the compressed nonlinear encoded assets 102a and the nonlinear encoded assets 102b using the format converter 106 and further converts the assets 102a and 102b from nonlinear to linear using the nonlinear to linear light conversion module 108 after format conversion has been performed.

The rendering system 100 further includes a linear to nonlinear light conversion module 112 and a compression module 114 according to some embodiments. The linear to nonlinear light conversion module 112 is configured to convert rendered assets from linear to nonlinear format according. The compression module 114 is configured to compress the decompressed rendered assets. The output format of the rendering system 100 may be one or more of a variety of formats, including, for example, compressed and/or uncompressed formats. When the input assets are nonlinear coded, the rendering system 100 can convert the nonlinear coded assets from a source format to the render domain format using the format converter 106, convert the nonlinear assets in the render domain format to linear assets using the nonlinear to linear light conversion module 108, generate linear rendered assets using the render engine 110, and converts the linear rendered assets to nonlinear rendered assets using the linear to nonlinear light conversion module 112 according to some embodiments. If the input graphical assets are compressed assets, the rendering system 100 uses the decompression module 104 to decompress the assets before rendering the assets and uses the compression module 114 to compress the rendered assets to generate the output asset. According to one or more embodiments, the rendering system 100 renders an assets in layered "planes" through multiple passes by transmitting the output rendered asset back to input to the rendering system 100 multiple times, so that each output is fed back to the input for the next pass. When the rendering system 100 finishes the multiple passes, the processed asset is output to be displayed and the rendering system 100 starts to process next asset.

Figure 2:
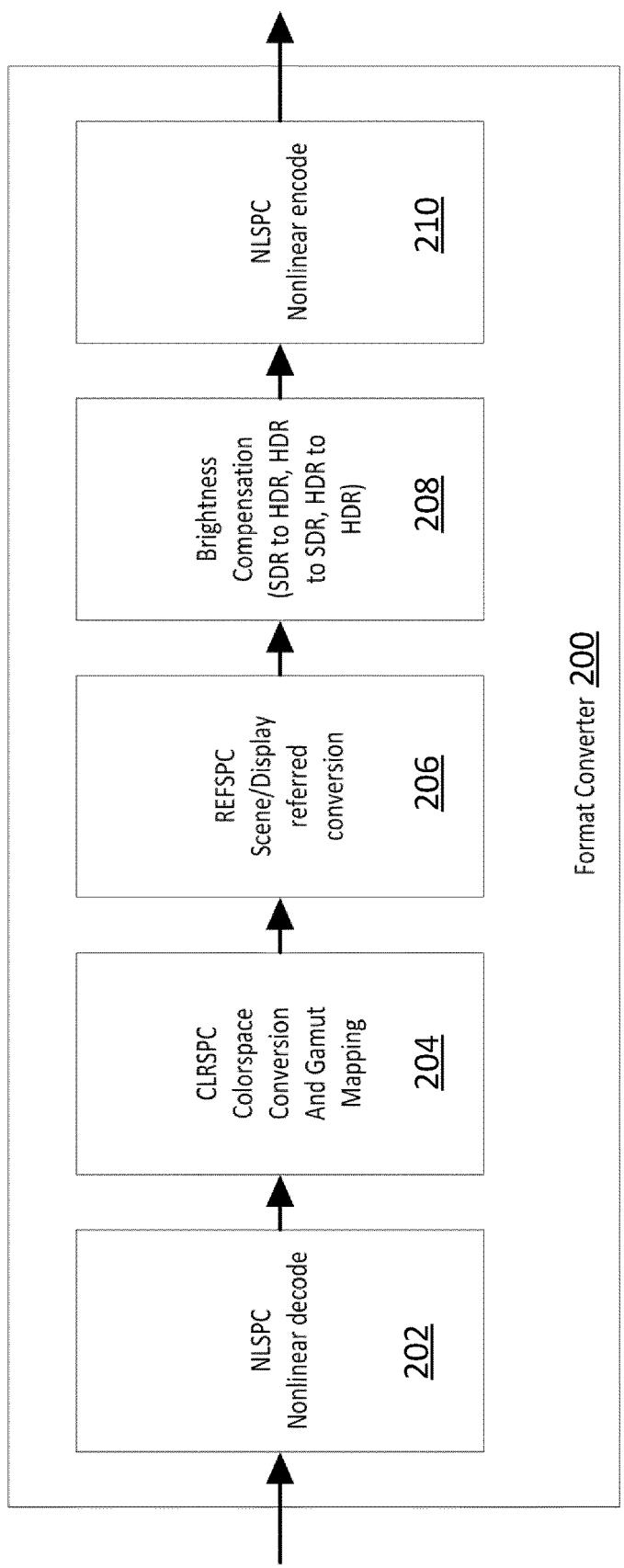
FIG. 2 a diagram of a format converter of a rendering system according to an illustrative embodiment.

Referring to FIG. 2, a diagram of format converter 200 of a rendering system is depicted according to an illustrative embodiment. In some embodiments, the format converter 200 can be used as the format converter for a rendering system such as the rendering system 100 as shown in FIG. 1. A format of graphical assets is defined by multiple parameters, including, but not limited to, color space, nonlinear space, and light source according to one or more embodiments.

TABLE 1

Parameters used to define a video/graphics format

| Graphics/Video Format Parameter | Description | Examples defined in |
|---|---|---|
| CLRSPC | Colorspace (chromaticities) defining particular R, G, B primaries and white point (temperature of white given equal amounts of R, G, B). | sRGB<br>ITU-R BT.601<br>ITU-R BT.709<br>ITU-R BT.2020<br>ITU-R BT.2100<br>D65 (6500K whitepoint) |
| NLSPC | Nonlinear Signal Transformation for Efficient Encoding of Signals | sRGB<br>ITU-R BT.709<br>ITU-R BT.1886<br>ITU-R BT.2100<br>SMPTE ST.2084 |
| REFSPC | System assumption of whether signal encodes light received by camera or light emitted by display | Scene Referred<br>Display Referred<br>ITU-R BT.2100 |

Table 1 shows some parameters used to define a particular graphical asset format and examples of standards that define the particular values used for each parameter according to example embodiments. These parameters are implicated any kinds of format standards such as standard or high dynamic range, standard or wide gamut, peak white brightness and minimum black brightness, etc.

The format converter 200 is configured to receive a bitstream from a source including graphical assets in source formats and convert the graphical assets from the source formats to a desired target format. The desired format is selected based on a domain format of a render engine used to render the graphical assets (e.g., a linear light rendering domain format in the embodiment shown in FIG. 1). In some embodiments, source formats of the graphics are indicated by the header of the bitstream. In some embodiments, the source formats are determined using sideband signaling over wired communication (e.g., HDMI) wherein the source and the output (e.g., display) negotiates and agrees on a source format. In some embodiments, the source formats are built into a standard (e.g., the National Television System Committee (NTSC) composites input that has predefined and fixed colorspace, nonlinear space, and reference space). In some embodiments, the source formats are in standard formats (e.g., in sRGB format for JPEGs as defined by the standard). In some embodiment, each source format specifies parameters including color space (CLRSPC), nonlinear space (NLSPC), and reference space (REFSPC). In some embodiments, the bitstream header or HDMI sideband information specify each parameter independently. In some embodiments, the REFSPC is specified based on the choice of NLSPC. In some embodiments, source formats of the graphics are decided by the creator of those graphics. For example, a set of fonts or graphical textures (used for adding texture to 3D renderings) can be created in a particular format. In some embodiments, the source formats decided by the creator are indicated as part of a package set.

The format converter 200 includes multiple circuits configured to implement portions of the conversion process. In the illustrated embodiment, the circuits include an NLSPC decode circuit 202, a CLRSPC conversion and gamut mapping circuit 204, a REFSPC scene/display referred conversion circuit 206, a brightness compensation circuit 208, and a NLSPC encode circuit 210. In other embodiments, it should be understood that fewer, additional, or different circuits could be used. In various embodiments, the circuits may be implemented using hardware (e.g., integrated circuits), software (e.g., instructions stored in a memory executable by a processor), or a combination of the two. These circuits are shown in an order in FIG. 2, but the order of the circuits can be reordered according to one or more embodiments. For circuits of the format converter 200 that are configured to perform nonlinear decoding or encoding, the format converter 200 can bypass these circuits when processing linear decoded and/or encoded assets. Similarly, for circuits of the format converter 200 that are configured to process linear input or generate linear output, in some embodiments, the format converter 200 bypasses these modules when processing a nonlinear decoded and/or encoded assets.

The NLSPC decode circuit 202 is configured to nonlinearly transform the input assets when the input assets are nonlinear encoded. In some embodiments, the NLSPC decode circuit 202 implements any suitable algorithms (e.g., mathematical functions, lookup table, or piecewise-linear (PWL) approximations) for converting the input asset from nonlinear space to linear space.

The CLRSPC conversion and gamut mapping circuit 204 is configured to map the decoded assets from a source colorspace and gamut to a colorspace and gamut of the render domain. The colorspace and gamut mapping includes changing the red, green, and blue primaries and white point (temperature of white given equal amounts of red, green, and blue) values of decoded assets to primary and white point values of the render domain. In some embodiments, the primaries and white-point values are indicated by the source formats, and by knowing the input and output formats, the system can determine the input and output primaries and white-point values.

The REFSPC scene/display referred conversion circuit 206 is configured to determine light sources (e.g., light received from camera, light emitted by display) according to one or more embodiments. The REFSPC scene/display referred conversion circuit 206 determines a light source of the output format. In some embodiments, input formats are defined based on light sources. The REFSPC scene/display referred conversion circuit 206 converts the light sources of the input assets to the light source of the output format. For example, if the input assets are recorded from an outdoor scene with a camera with some peak brightness that are out of a range within which a television can display. The REFSPC scene/display referred conversion circuit 206 linearly scales the peak brightness of the outdoor scene to a peak brightness of the television and adjust the assets by adding contrast to the assets according to the viewing environment. In some embodiments, the scene/display referred conversion circuit 206 uses an optical to optical transfer function (OOTF) to adjust the contrast to the linearly scaled assets. One example of an OOTF is a gamma adjustment as shown below:

$$Light_{display} = scale\_factor \times Light_{scene}^\gamma$$

In some embodiments, the input assets are encoded with display light such that the brightness range of the input assets can be displayed on a display device (e.g., television). In some such embodiments, the REFSPC scene/display referred conversion circuit 206 is bypassed. In some embodiments, when the input assets and the output assets have the same REFSPC, the REFSPC scene/display referred conversion circuit 206 is bypassed. In some embodiments, when the input assets are scene referred and the output requires display referred, the REFSPC scene/display referred conversion circuit 206 performs OOTF adjustment. In some embodiments, when the input assets are display referred and the output requires scene referred, the REFSPC scene/display referred conversion circuit 206 performs an inverse OOTF. The brightness compensation module 208 is configured to adjust the brightness of the decoded assets from source brightness to the brightness of the render domain. For example, when the converter 200 processes SDR to HDR conversion, the converter 200 boosts the brightness of the displayed signal so that it does not look unnaturally dark compared to HDR sources. When the converter 200 processes HDR to SDR conversion, the converter 200, the SDR signal cannot go as bright or as dark as the HDR source. In this case, the converter maps the signals that are out of range into the available range of the available SDR output signal.

The NLSPC nonlinear encode circuit 210 is configured to nonlinearly encode the converted assets to generate a nonlinear output.

The output of the format converter 200 is compatible with the render domain format. The input of the format converter 200 can be any format compatible or incompatible to the render domain format in some embodiments. According to some embodiments, the format converter 200 is bypassed by the rendering system if the input assets of the rendering system having a format that is compatible with the render domain.

Figure 3:
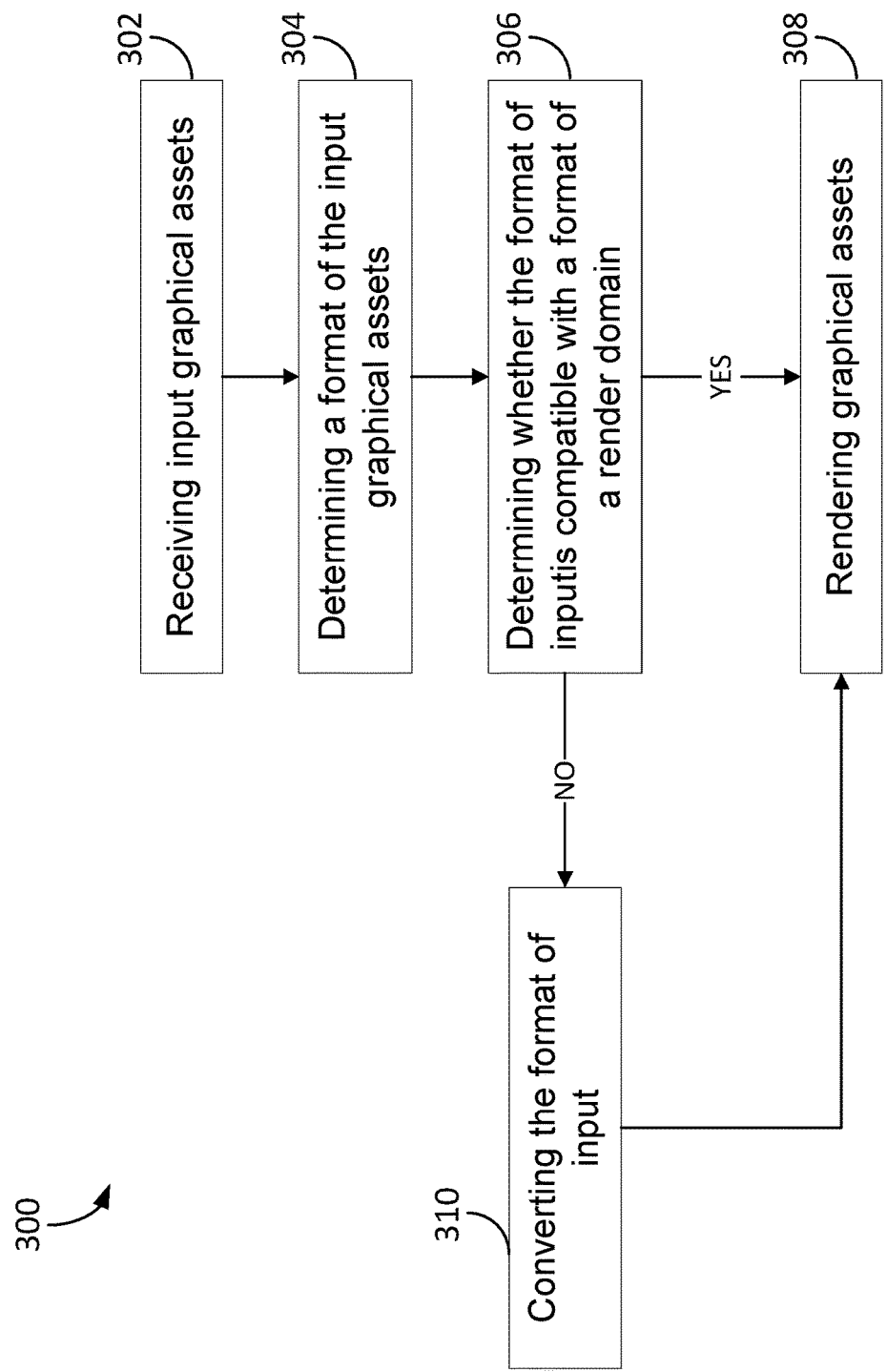
FIG. 3 a flow chart of a process of rendering graphical assets according to an illustrative embodiment.

Referring to FIG. 3, a flow chart of a process 300 of rendering graphical assets is depicted according to an illustrative embodiment. The process 300 includes receiving input graphical assets 302, determining a format of the input graphical assets 304, determining whether the format of the input graphical assets is compatible with a format of a render domain 306, rendering the graphical assets in response to determining the format of the input graphical assets is compatible with the format of the render domain 308, converting the format of the input graphical assets from the input format to the format of the render domain 310, and rendering the graphical assets 308.

At operation 302, the input graphical assets are received. In some embodiments, the input graphical assets may be in any source formats. The source formats are not limited to a format of the render domain or required output format. The input graphical assets can include multiple input source formats.

At operation 304, the rendering system determines a format of the input graphical assets according to one or more embodiments. When the input graphical assets have more than one format, the rendering system determines a format of each input graphical asset.

At operation 306, the rendering system determines for each input asset whether the format of the input asset is compatible with a format of a render domain. The compatible formats are not necessarily the same format; in some instances, multiple formats may be compatible with the render domain format. At operation 308, in response to determining the format of the input graphical assets is compatible with the render domain, the rendering system renders the graphical assets using in the render domain using the format of the render domain. At operation 310, in response to determining the format of the input graphical assets is not compatible with the render domain, the rendering system converts the formats of the input graphical assets to a format that is compatible with render domain. Upon converting all incompatible formats of the input graphical assets, the rendering system renders the graphical asset at operation 308.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method, comprising:
   receiving a plurality of graphical assets each having a format of a plurality of formats, wherein each format is defined by multiple parameters comprising at least one of nonlinear space and light source;
   for each graphical asset, processing the graphical asset before rendering the graphical asset by:
      determining whether the format of the graphical asset is compatible with a predetermined render domain format; and
      responsive to determining the format is not compatible with the predetermined render domain format, converting, using a format conversion circuit, the format to the predetermined render domain format; and
   rendering, using a single rendering engine operably coupled to the format conversion circuit, the plurality of graphical assets using the predetermined render domain format.

2. The method of claim 1, wherein converting the format to the predetermined domain format includes mapping colorspace and gamut of the graphical asset to a predetermined colorspace and gamut of the render domain.

3. The method of claim 1, further comprising determining, for each graphical asset, whether the graphical asset is nonlinear encoded.

4. The method of claim 3, further comprising responsive to determining that the graphical asset is nonlinear encoded, converting the graphical asset from nonlinear to linear before rendering.

5. The method of claim 4, further comprising converting the rendered graphical asset from linear to nonlinear.

6. The method of claim 1, wherein converting the format to the predetermined domain format includes changing brightness of the graphical assets to a predetermined brightness associated with the render domain.

7. The method of claim 1, further comprising responsive to determining the format is compatible with the predetermined domain format, rendering the graphical asset using the format.

8. A rendering system, comprising:
   a format converter configured to convert each of a plurality of graphical assets each having a format of a plurality of formats to a predetermined format of a render domain, wherein each format is defined by multiple parameters comprising at least one of nonlinear space and light source; and
   a render engine operably coupled to the format converter and configured to render the plurality of graphical assets using the predetermined render domain format.

9. The rendering system of claim 8, further comprising a nonlinear to linear light conversion circuit configured to transform the converted plurality of graphical assets from nonlinear to linear before rendering and the multiple parameters, comprise colorspace, nonlinear space and light source.

10. The rendering system of claim 8, further comprising a linear to nonlinear light conversion circuit configured to transform the rendered plurality of graphical asset from linear to nonlinear after rendering.

11. The rendering system of claim 8, wherein the format converter is configured to map colorspace and gamut of the plurality of graphical assets to a predetermined colorspace and gamut of the render domain.

12. The rendering system of claim 8, wherein the format converter is configured to change brightness of the graphical assets to a predetermined brightness associated with the render domain.

13. The rendering system of claim 8, wherein the format converter is configured to convert the plurality of formats of the plurality of graphical assets by changing one or more format parameters that define the formats of the graphical assets.

14. The rendering system of claim 13, wherein the one or more format parameters comprise a color space parameter, a nonlinear space parameter, and a light source parameter.

15. The rendering system of claim 8, wherein the format of the input graphical asset is independent of the predetermined format of the render domain.

16. One or more non-transitory computer-readable storage media having instructions stored thereon that, when executed by at least one processor, cause the at least one processor to perform operations comprising:
receiving a plurality of graphical assets each having a format of a plurality of formats, wherein each format is defined by multiple parameters comprising at least one of nonlinear space and light source;
for each graphical asset, processing the graphical asset by:
determining whether the format of the graphical asset is compatible with a predetermined render domain format; and
responsive to determining the format is not compatible with the predetermined render domain format, converting, using a format conversion circuit, the format to the predetermined render domain format; and
rendering, using a single rendering engine operably coupled to the format conversion circuit, the plurality of graphical assets using the predetermined render domain format.

17. The one or more non-transitory computer-readable storage media of claim 16, wherein converting the format to the predetermined domain format includes mapping colorspace and gamut of the graphical asset to a predetermined colorspace and gamut of the render domain.

18. The one or more non-transitory computer-readable storage media of claim 16, wherein converting the format to the predetermined domain format includes changing brightness of the graphical assets to a predetermined brightness associated with the render domain.

19. The one or more non-transitory computer-readable storage media of claim 16, wherein the operations further comprise responsive to determining the format is compatible with the predetermined domain format, rendering the graphical asset using the format.

20. The one or more non-transitory computer-readable storage media of claim 16, wherein the format of the graphical asset is independent of the predetermined render domain format.

* * * * *